INVENTOR.
Robert J. Stuart
BY
Barnard, McGlynn & Reising
ATTORNEYS

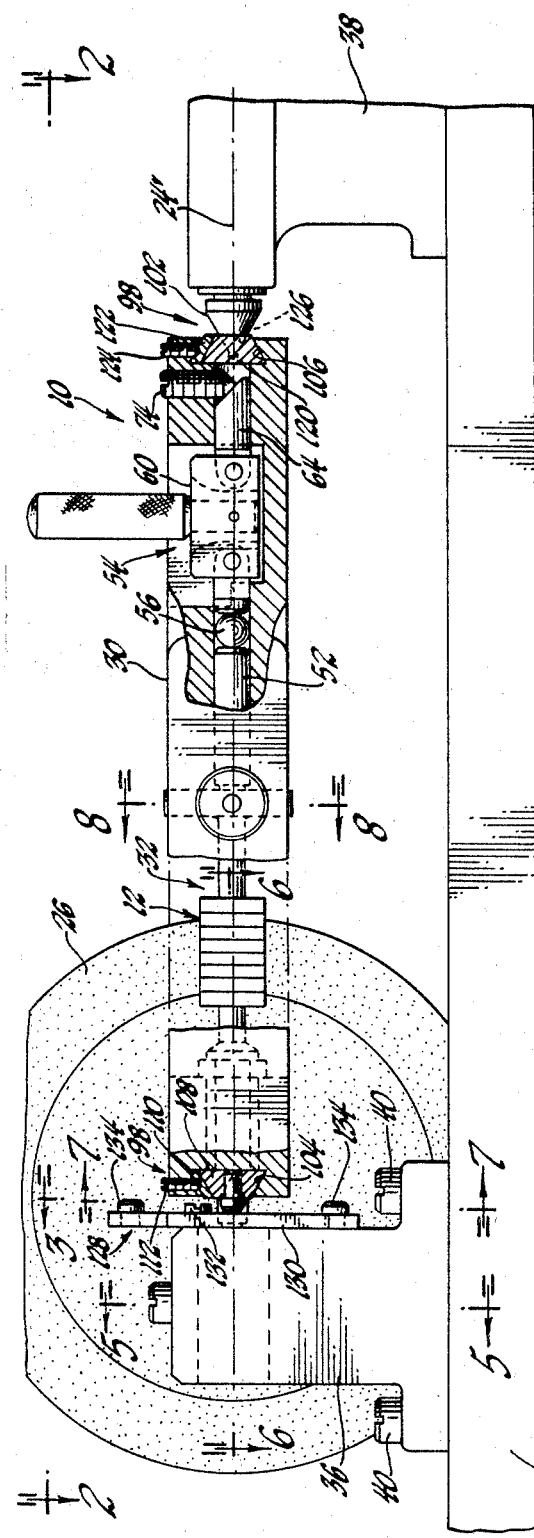

United States Patent Office 3,434,245
Patented Mar. 25, 1969

3,434,245
APPARATUS AND METHOD FOR GRINDING INSERTS
Robert J. Stuart, Bloomfield Hills, Mich., assignor to Dex-A-Grind, Inc., Birmingham, Mich., a corporation of Michigan
Filed Sept. 13, 1965, Ser. No. 486,920
Int. Cl. B24b 7/00, 9/00, 5/00
U.S. Cl. 51—124                    30 Claims

ABSTRACT OF THE DISCLOSURE

A work holder and, more particularly, a work holder particularly suitable for grinding indexable-throwaway inserts of the type having a pair of parallel faces and a plurality of plane sides thereabout extending between the faces with an arcuate surface tangent to and joining adjacent sides, which work holder includes means for rotating the inserts about a first axis to grind the arcuate surfaces and means for independently rotating the inserts about a second axis which is in parallel and spaced relationship with the first axis to successively position the sides for grinding thereof.

---

Inserts of the type which may be ground by utilization of the instant invention are frequently utilized in milling head cutters and the like. The inserts are usually made of hard tungsten carbide, titanium, hard steel, or the like. Such inserts are frequently secured in a circle about a milling head cutter so that as the milling head cutter rotates the inserts successively engage a work piece for cutting material from the work piece. The inserts used in any particular milling head cutter must be of substantially identical size and shape so that each insert performs an identical cutting function as it contacts the work piece.

The shapes of the inserts used in various different milling operations may vary widely, however. As pointed out above the inserts normally have a pair of parallel faces with a plurality of plane sides extending between the faces. Typical of the shape of such an insert is one wherein the parallel faces are substantially triangular so that there are three plane sides disposed about the insert which extend between the parallel faces. Additionally, the inserts have rounded corners joining adjacent plane sides. That is to say, in the case of the triangular-shaped insert, an arcuate surface is tangent to and extends between adjacent plane sides so that as the insert is viewed from a position substantially perpendicular to the triangular parallel faces, the apexes or corners of the triangle are clearly seen to be rounded or arcuate. The inserts, therefore, have cutting edges which are defined by the intersection of each of the plane sides with each of the parallel faces. Consequently, as the insert is disposed in a milling head, or the like, one of the particular cutting edges is utilized until it has become dull or otherwise unsuitable for further cutting. The insert is then removed from the milling head cutter and reinserted in a different relative position to the milling head cutter such that one of the other cutting edges is in position for milling the work piece. After all such cutting edges of a particular insert have been utilized, the insert is normally thrown away. Thus, the inserts are known as indexable-throwaway inserts. In an insert of the type having substantially triangular shaped parallel faces, there is a total of six cutting edges since each plane side provides a cutting edge at each of its intersections with the two respective parallel faces, and there are three such plane sides. It, therefore, follows that if such an insert has parallel faces which are substantially rectangular it will have eight such cutting edges, and if the insert is a five-sided insert it will provide ten cutting edges, and so on.

In addition to the various shapes and sizes of indexable-throwaway inserts which are utilized in various milling operations, the various inserts for particular milling environments also utilize various arcuate surfaces. That is to say, a group of inserts suitable for use in one milling operation may have a particular triangular shape which is the same size as the triangular shape of a second group of inserts utilized in a second milling operation, yet the two groups of inserts may differ in that one group of inserts may have arcuate surfaces which are defined by a smaller radius than the radius defining the arcuate surfaces in the other group of inserts.

Indexable-throwaway inserts are normally made or finished by grinding. Heretofore this grinding process has normally been very complex due to the various shapes, sizes and different radii defining the arcuate surfaces of the various inserts. One of the most common methods which has been utilized heretofore for grinding such indexable-throwaway inserts has been to utilize a cam and cam follower arrangement. More specifically, a cam is machined which has a size and shape proportional to the particular insert to be ground and a cam follower rides upon such a cam to control the relative disposition between the inserts being ground and the abrasive grinding wheel so that a particular shape, size and arcuate surfaces are ground into the particular insert. As is evident from the foregoing discussion of the different sizes, shapes and arcuate surfaces of various indexable-throwaway inserts, it is necessary to utilize a different cam for every particularly shaped insert. For example, one cam might be utilized in grinding a substantially triangular-shaped insert having arcuate surfaces of a particular radius, yet another cam must be utilized for grinding a substantially triangular insert of the same general size but having a different radius defining the arcuate surfaces. Such a system for grinding indexable-throwaway inserts is not only complex but it also lacks versatility in that every time a particularly shaped insert is to be ground, a cam must first be machined which is proportional to the shape of the particular insert to be ground, and the fabrication of such a cam is not only time consuming but is very expensive.

There are various other methods and apparatuses utilized in grinding indexable-throwaway inserts, most of which have the common disadvantage of necessitating the removal and repositioning of the insert in the apparatus a plurality of times depending upon the particular configuration of the insert to be ground. That is to say, in order to grind an indexable-throwaway insert in various of the prior art apparatuses, the insert is secured in the apparatus relative to the abrasive grinding wheel so that a portion of the insert may be ground, but in order to grind another portion of the insert, the insert must be removed from the apparatus and repositioned relative to the abrasive grinding wheel and resecured in the apparatus for subsequent grinding. Each time an insert is removed and replaced in position for grinding of successive portions thereof, there is created the potential for error in the grinding process whereby the insert may not be ground in the exact configuration desired.

The various methods and apparatuses utilized heretofore for grinding indexable-throwaway inserts are, therefore, complex, expensive, require large amounts of time for grinding particular inserts, are subject to error in grinding, and are not readily adaptable for grinding inserts of various configurations.

Accordingly, it is an object and feature of this invention to provide a work holder which is simple in construction and may be utilized to grind the entire configuration of an indexable-throwaway insert without removing the insert from the work holder.

Another object and feature of this invention is to provide a work holder for grinding indexable-throwaway inserts of the type having a pair of parallel faces and a plurality of plane sides thereabout extending between the faces with an arcuate surface tangent to and joining adjacent sides, which work holder may be adjusted to grind arcuate surfaces defined by various radii as determined by the adjustment.

A further object and feature of this invention is to provide a work holder for grinding indexable-throwaway inserts of the type having a pair of parallel faces and a plurality of plane sides thereabout extending between the faces with an arcuate surface tangent to and joining adjacent sides, which holder is suitable for grinding such inserts regardless of the number of plane sides disposed thereabout by merely manipulating the work holder in a different manner for each particular number of sides to be ground.

In general, these and other objects and features of this invention are attained by a work holder including a cradle adapted to be mounted between first and second mounts on a grinding machine table so that the cradle may be rotated about a first axis relative to the mounts. A first clamping member extends from and is disposed in the cradle for rotation about a second axis which is in parallel and spaced relationship to the first axis. A second clamping member is coaxial with the first clamping member about the second axis and is rotatably and slidably disposed in the cradle with a first end extending toward the first clamping member. There is also disposed on the cradle an actuating means for moving the second clamping member toward the first clamping member for maintaining the second clamping member at a predetermined distance from the first clamping member so that inserts may be clamped between the clamping members. An indexing dial extends radially about the second clamping member and has a plurality of radial slots circumferentially disposed thereabout in predetermined angular relationships. A selector pin is slidably disposed in the cradle and is biased toward the dial so that it may be inserted into selected ones of the slots to prevent rotation of the dial relative to the cradle. An adjustment means rotatably interconnects the cradle and the first and second mounts for selectively changing the distance between the first and second axes. There is also included a stop means operatively interconnecting the cradle and one of the mounts for limiting the amount of rotation of the cradle about the first axis relative to the mounts. One or more inserts may be clamped between the first and second clamping members, and the table of the grinding machine may be moved such that the mounts move the cradle into a position so that an abrasive grinding wheel contacts the inserts to grind one plane side thereof. Once the first plane side is ground into the inserts, the cradle is rotated relative to the mounts about the first axis to grind an arcuate surface which is tangent to the first plane side and which extends to the second plane side to be ground. The position of the second plane side is determined by the stop which controls the rotative movement of the cradle. Once the second plane side is ground, the table of the grinding machine is moved so that the cradle is moved away from the abrasive grinding wheel. The cradle is then rotated back to the initial starting position. Once the cradle has been rotated back to the initial starting position, the selector pin is moved such that the indexing dial may be rotated a number of degrees commensurate with the number of sides on the particular insert being ground. The pin is then reinserted into a slot to maintain the dial in the selected angular position. The selected angular position is such that the second plane side, which has already been ground, is in relationship to the grinding wheel so that movement of the table to move the cradle to the grinding wheel places the second side into minimal contact with the grinding wheel. The cradle is then again rotated relative to the mounts about the first axis to grind a second arcuate surface which is tangent to the second plane side ground and to the third plane side, which is ground when the cradle contacts the stop. The steps are then repeated until the total number of sides and arcuate surfaces on the insert have been ground.

Other objects and attendant advantages of the present invention will be readily appreciated as the same becomes better understood by reference to the following deltaied description when considered in connection with the accompanying drawings wherein:

FIGURE 1 is a side elevational view partly broken away of a preferred embodiment of the present invention;

FIGURE 2 is a view taken substantially along line 2—2 of FIGURE 1;

Referring now to the drawings, wherein like numerals indicate like or corresponding parts throughout the several views there is generally shown at 10 a work holder for grinding indexable-throwaway inserts, generally shown at 12.

Figure 9:
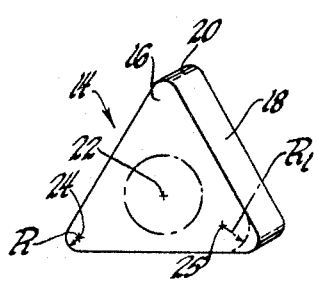
FIGURE 9 is an enlarged isometric view of an indexable throwaway insert illustrative of the type which may be ground in accordance with the instant invention.

An indexable-throwaway insert of the type which may be ground in accordance with the instant invention is generally shown at 14 in FIGURE 9. The insert 14 has a pair of parallel faces, one of which is shown at 16. A plurality of plane sides 18 are disposed thereabout and extend between the faces 16. Also, arcuate surfaces 20 are tangent to and join adjacent sides 18. As alluded to previously, indexable-throwaway inserts of the type which may be ground in accordance with the instant invention may have faces 16 of various configurations. For example, face 16, instead of being substantially triangular as shown in FIGURE 9, may be rectangular, hexagonal, pentagonal, and so on with a commensurate number of plane sides. Regardless of the particular shape of the insert to be ground, a central axis 22 passes through the center of the insert and is perpendicular to the parallel faces.

Each of the arcuate surfaces 20 is tangent to and joins adjacent plane sides 18. Each arcuate surface 20 is defined by a portion of an imaginary circle having a center 24 and a radius R. As pointed out hereinbefore, each insert of substantially the same configuration and size may have various arcuate surfaces as defined by a different radius R. For example, the arcuate surface may be defined by a portion of a larger imaginary circle as defined by the radius R. The imaginary circle defining the arcuate surface shown in phantom in FIGURE 9 has a center at 25. As is evident from FIGURE 9, when a particular arcuate surface, as defined by the imaginary circle having a particular radius, is to be ground on an insert, there is a definite relationship or distance between the center of the imaginary circle, such as center 24 or center 25, and the center 22 of the insert. That is to say, the smaller the radius defining the arcuate surface 20, the greater the distance between the central axis 22 of the insert 14 and the axis of the center of the imaginary circle defining the arcuate surface.

The indexable-throwaway inserts generally shown at 12 in FIGURES 1 and 2 are a plurality of stacked inserts similar to the insert 14 but having any particular number of sides and arcuate surfaces. The inserts 12 are held in position by the work holder 10 for grinding contact with the abrasive grinding wheel 26.

The work holder 10 comprises a holding means for rotating the inserts 12 about a first axis 24' to grind arcuate surfaces, such as the arcuate surfaces 20 of the insert 14, and for independently rotating the inserts 12 about a second axis 22' which is in parallel and spaced relationship with the first axis to successively position the plane sides 18 for grinding thereof. More particularly, the holding means includes a cradle 30, a clamping means, generally shown at 32, and an indexing means, generally shown at 34.

The cradle 30 is adapted, as will be more fully explained hereinafter, to be mounted between first and second mounts 36 and 38. The mounts 36 and 38 are secured by any appropriate means, such as the bolts 40, to the table or base plate 42 of a grinding machine. A table 42 is usually provided on grinding machines and is operatively connected to a mechanism for moving the table 42 so that the mounts 36 and 38 are moved in particular paths relative to the grinding wheel 26. The cradle 30 is mounted on the mounts 36 and 38 for rotation about a first axis 24'.

Figure 6:
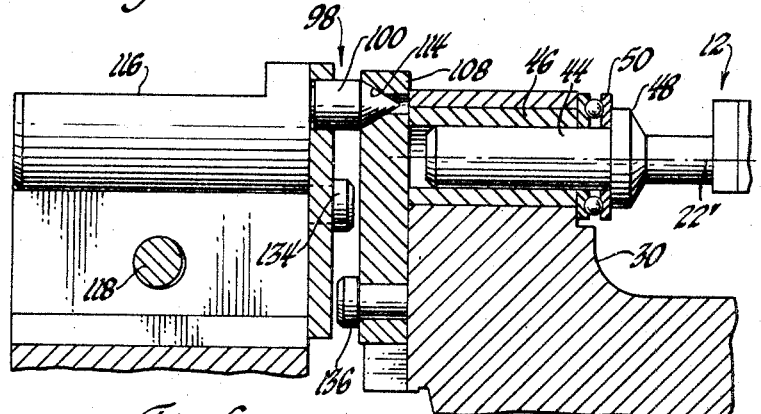
FIGURE 6 is an enlarged fragmentary cross-sectional view taken substantially along line 6—6 of FIGURE 1.
Figure 7:
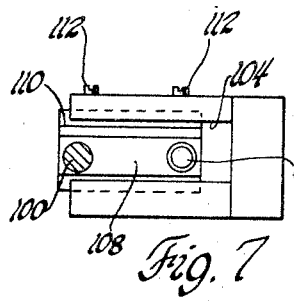
FIGURE 7 is a cross-sectional view taken substantially along line 7—7 of FIGURE 1.

The clamping means 32 is operatively connected to the cradle 30 for holding the inserts 12 and for selectively rotating the inserts relative to the cradle 30 about a second axis 22'. The clamping means 32 includes a first clamping member 44 extending from and disposed in the cradle 30 for rotation about the axis 22'. As is more clearly shown in FIGURE 6, the clamping member 44 is journaled in a sleeve or bushing 46 which is in turn disposed in the cradle 30. The clamping member 44 has a flange 48 disposed thereabout which engages the thrust bearing 50 so that the clamping member 44 is freely rotatable relative to the cradle 30.

The clamping means 32 also includes a second clamping member 52 which is coaxial with the first clamping member 44 about the axis 22'. The second clamping member 52 is rotatably and slidably disposed in the cradle 30 with a first end thereof extending toward the clamping member 44.

Figure 4:
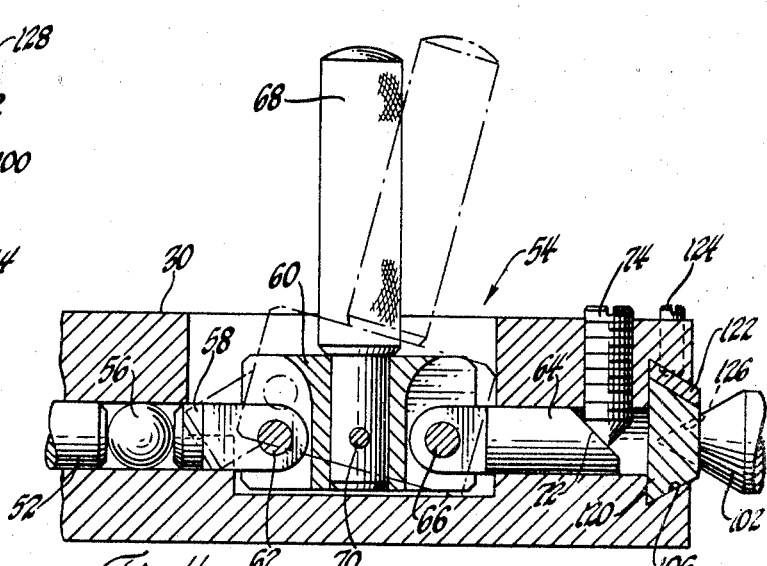
FIGURE 4 is an enlarged fragmentary view in cross section taken substantially along line 4—4 of FIGURE 2.
Figure 5:
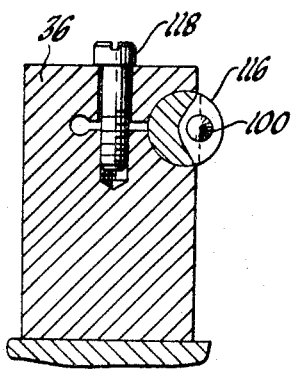
FIGURE 5 is a cross-sectional view taken substantially along line 5—5 of FIGURE 1.

The clamping means 32 also includes an actuating means, generally shown at 54, for moving the second clamping member 52 toward the first clamping member 44 and for maintaining the second clamping member 52 a predetermined distance from the first clamping member 44 so that the inserts 12 may be retained between the clamping members 44 and 52. The actuating means 54 is more clearly shown in FIGURE 4 and includes a ball 56 disposed in the cradle 30 in abutting relationship with the second end of the second clamping member 52. There is also included a plunger 58 disposed for movement in the cradle 30 and in abutting relationship with the ball 56.

The actuating means 54 also includes a positioning means for moving the plunger 58 and for maintaining the plunger in a predetermined position to maintain the inserts 12 between the clamping members 44 and 52. The positioning means is an over center locking device comprising the block 60 which is pivotally connected to the plunger 58 by the pin 62 and pivotally connected to a slide bar 64 by the pin 66. A handle 68 extends outwardly from the block 60 and is attached thereto by the pin 70. The slider bar 64 has a slanted surface 72 which engages the cone shaped end of the adjustment screw 74. The clamping means 32 may be released by moving the handle 68 toward the position shown in phantom although the handle need not be moved to the extent illustrated in phantom. The phantom showing is an extreme position indicating the manner in which the assembly may be removed from the cradle. In operation, a stack of inserts 12 are placed between the clamping members 44 and 52 and the screw 74 is threaded into the cradle 30 to move the slider bar 64 to the left as viewed in FIGURE 4. This moves the clamping member 52 into engagement with the stack of inserts 12. The handle 68 is then rotated counterclockwise as viewed in FIGURE 4 to move the plunger 58, the ball 56 and the clamping member 52 a very minute amount to tightly clamp the inserts 12 between the clamping members 44 and 52. The actuating means 54 is then locked due to the fact that once the handle is thus rotated this very minute amount, the center of the pin 62 is slightly below the center of the pin 66 such that the forces acting on the block 60 by the slider bar 64 and the plunger 58 create a moment tending to rotate the block 60 in a counterclockwise direction as viewed in FIGURE 4, thereby locking the handle 68 in position to securely retain the inserts 12 between the clamping members 44 and 52. The plunger 58, block 60, slider bar 64, and handle 68, therefore, provide an over center locking device of the type well-known in the mechanical arts.

The indexing means 34 selectively allows the clamping members 44 and 52 to be rotated about the axis 22' relative to the cradle 30. The indexing means 34 is most clearly shown in FIGURES 2 and 8 and includes a dial 76 extending radially about the clamping member 52 with a plurality of radial slots 78 disposed circumferentially thereabout in predetermined angular relationships. A selector pin 80 is slidably disposed in the cradle 30 for insertion into selective ones of the slots 78 to prevent rotation of the dial 76 relative to the cradle 30. The selector pin 80, as is more clearly shown in FIGURE 8, has an enlarged portion 82 with a beveled end 84 and a stem attached to a knurled knob 86. The selector pin 80 is slidably disposed in a bushing 88 which is retained in the cradle 30. A spring 90 abuts the enlarged portion 82 and is held in place by a threaded cap 92. The spring 90 therefore coacts with the cradle 30 and the selector pin 80 for biasing the selector pin 80 into any selected one of the slots 78. Also, the dial 76 has a threaded bore 94 at the radially inward extremity of each of the slots 78 so that a threaded pin 96 may be inserted into any one of the slots 78 to prevent the beveled portion 84 of selector pin 80 from being inserted into a particular slot 78.

The work holder 10 also includes adjustment means, generally shown at 98, which is operatively connected to the cradle 30 and the first and second mounts 36 and 38 so that the cradle is rotatably connected to the mounts 36 and 38 and so that the distance between the axes 22' and 24' may be selectively changed to establish a particular radius R for the arcuate surfaces 20. The adjustment means 98 includes a first support pin 100, which has a cone shaped end and extends from the first mount 36, and a second support pin 102, which has a cone shaped end and extends from the second mount 38. The support pins 100 and 102 are coaxial about the first axis 24'. The cradle 30 has a first dovetail slot 104 in the first end thereof and a second dovetail slot 106 in the second end thereof.

A first block 108, having a trapezoidal cross section, is disposed in the first dovetail slot 104. A first retaining means comprising a spacer plate 110 and a set screw 112 selectively prevents relative movement between the block 82 and the cradle 30. The spacer plate 110 is disposed in the dovetail slot 104 with the block 108 so that the set screw 112 may be tightened against the spacer plate 110 to wedge the spacer plate 110 and the block 108 in the dovetail slot 104 to prevent relative movement between the block 108 and the cradle 30. The block 108 has a cone shaped recess 114 for receiving the cone shaped end of the support pin 100. The support pin 100 is secured to or integral with the arcuate member 116 which is clamped in the mount 36 by the bolt 118.

The adjustment means 98 also includes a second block 120 which has a trapezoidal cross section and is disposed in the dovetail slot 106. There is also included a second retaining means comprising the spacer plate 122 and a set screw 124 for preventing relative movement between the block 120 and the cradle 130. The second spacer plate 122 is disposed in the dovetail slot 106 with the block 120 so that they may be engaged by the set screw 124, which is threadedly disposed in the cradle 30, to force the spacer plate 122 against the block 120 for preventing relative movement between the block 120 and the cradle 30. The second block 120 has a cone shaped recess 126 therein for receiving the cone shaped end of the second pin 102. The adjustment means, therefore, controls the distance between the axes 22' and 24' which in turn controls the radius R of the arcuate surfaces on the particular inserts being ground.

The work holder 10 also includes a stop means, generally shown at 128, for limiting the amount of rotation of the cradle 30. The stop means 128 limits the amount of rotation of the cradle 30 in correlation with the number of degrees traversed by each of the arcuate surfaces 20, which will become more clear hereinafter as the operation of the work holder 10 is more fully explained.

The stop means 128 includes a stop plate 130 removably mounted on the first mount 36 by the studs 132. First and second stop pins 134 extend from the stop plate 130 toward the cradle 30. A third stop pin 136 extends from the block 108 toward the mount 36 for engaging the first and second stop pins 134 respectively to define a predetermined arc of rotary movement of the cradle 30 about the axis 24'.

OPERATION

The operation of the work holder 10 will be explained by using as an example the grinding of an insert having the general configuration of the insert illustrated in FIGURE 9. The work holder 10 is first positioned between the mounts 36 and 38. The adjustment means 98 is operated by the set screws 112 and 124 to establish the desired distance between the axes 22' and 24', as is best illustrated in FIGURE 2. A plurality of inserts 12 are retained between the clamping members 44 and 52. The inserts 12 are disposed between the clamping members 44 and 52 such that the central axis corresponding to axis 22 illustrated in FIGURE 9 is coaxial or coincident with the axis 22' illustrated in FIGURE 2. As pointed out above, the clamping members 44 and 52 are coaxial about the axis 22'. It is clear therefore that the rotation of the plurality of inserts 12 about the central axis 22 passing through the center of the faces of the inserts is controlled by the dial 76 and the selector pin 80.

As the inserts are shown in FIGURES 1 and 2, the grinding wheel 26 is grinding the very top of one of the arcuate surfaces 20. As will be evident from FIGURE 2, the axis 24' about which the cradle rotates relative to the mounts 36 and 38 is coaxial or coincident with the axis defining the center of the imaginary circle defining the arcuate surface joining two adjacent plane sides of the inserts 12. And as was pointed out in the description of the insert illustrated in FIGURE 9, the radius of each arcuate surface 20 increases as the center of these imaginary circles defining such an arcuate surface 20 approaches or is disposed a closer distance to the center or central axis 22 of the insert. Therefore, the adjustment means 98 controls the distance between the axes 22' and 24' to define the arcuate surfaces 20. More precisely, the closer the axis 22' and 24' are disposed together by means of the adjustment means 98, the greater will be the radius of the imaginary circle defining the arcuate surfaces 20 joining adjacent plane sides of the particular insert to be ground.

Once the adjustment means 98 has been positioned and the inserts 12 clamped between the clamping members 44 and 52, the table 42 is moved so that the inserts 12 come into contact with the grinding wheel 26 for grinding one of the plane sides 18 into the inserts 12. Once a first plane side is ground into the inserts 12, the cradle 30 is rotated about the first axis 24' as illustrated by the arrow in FIGURE 1. The axis 24' is defined by the support pins 100 and 102 and also coincides with the center of the imaginary circle defining the arcuate surface 20. Upon rotation of the cradle 30, the first arcuate surface 20 is ground into the inserts. The cradle 30 is rotated in the direction of the arrow of FIGURE 1 until the stop pin 136 engages the uppermost stop pin 134, at which point the inserts 12 are in position for grinding the second plane side. The second plane side is ground into the inserts 12 while the stop pin 136 abuts the uppermost stop pin 134. The table 42 is thereafter moved such that the inserts 12 move away from the grinding wheel 26. The cradle 30 is then rotated in the opposite direction back to its initial position so that the stop pin 136 contacts the lowermost stop pin 134. When the cradle 30 is returned to its initial position, the selector pin 80 is disengaged from the dial 76 and the dial 76 is rotated a predetermined number of degrees depending upon the number of sides in the particular inserts being ground. In the case of triangular inserts, the dial 76 will be rotated 120° and the pin 80 reinserted in one of the slots 78 to prevent further rotation of the dial 76 relative to the cradle 30. Once the dial 76 has been thus rotated the second plane side, which has already been ground into the inserts, may be moved into minimal or kissing contact with the grinding wheel 26. Once the second plane side is moved into minimal contact with the grinding wheel 26, the cradle 30 is again rotated in the direction of the arrows shown in FIGURE 1 to grind the second arcuate surface into the inserts. Once again the cradle moves in the direction of the arrow as shown in FIGURE 1 until the stop pin 136 engages the uppermost stop pin 134, at which point the third plane side is ground into the inserts 12. After the third plane side has been ground into the inserts 12, the inserts are again moved away from the grinding wheel 26 by movement of the table 42, the cradle 30 is rotated back to the initial position, and the dial 76 is rotated to position the third plane side for minimal contact with the grinding wheel 26. The table 42 is then moved to move the third plane side of the inserts 12 into minimal contact with the grinding wheel 26 whereupon the cradle 30 is again rotated in the direction of the arrow of FIGURE 1 to grind the third arcuate surface which joins the third plane side and the first plane side of the triangularly-shaped inserts 12.

Figure 3:
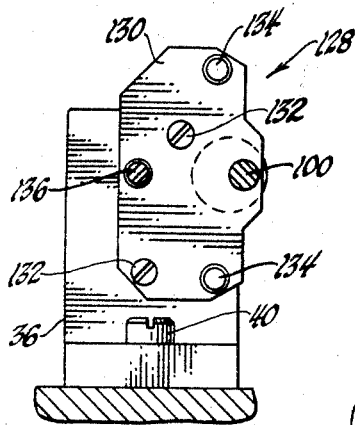
FIGURE 3 is a view taken substantially along line 3—3 of FIGURE 1.
Figure 8:
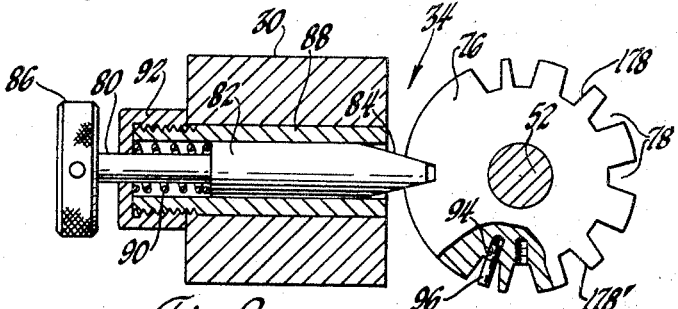
FIGURE 8 is an enlarged cross-sectional view taken substantially along line 8—8 of FIGURE 1.

The operation of the device has been described in connection with the grinding of a substantially triangularly-shaped insert as illustrated in FIGURE 9 and accordingly it will be noted that the particular stop plate 130 and stop pins 134 are disposed in a particular angular relationship for the particular number of sides which the inserts to be ground have. More specifically, the cradle 30 is rotated such that the stop pin 136 on the cradle moves between the two stop pins 134 in order to grind the arcuate surface 20. Therefore, different stop plates 130 having stop pins 134 disposed in different angular relationships will be utilized for inserts having a different number of plane sides. Likewise, the number of degrees the dial 76 is rotated to reposition the inserts 12 depends upon the number of plane sides of the inserts being ground. That is to say, when a substantially triangular insert of the type illustrated in FIGURE 9 is to be ground, each time the dial 76 is rotated to reposition the inserts 12, the dial will be indexed in increments of 120°, but if a substantially rectangular insert is to be ground, the dial will be indexed in increments of 90°. It is therefore clear, that the slots 78 are disposed in particular angular relationships depending upon the particular shape of the inserts to be ground. For example, when a substantially triangular-shaped insert of the type illustrated in FIGURE 9 is being ground, the dial 76 will be rotated 120° such that the selector pin 80 will be initially inserted into the slot as illustrated in FIGURE 8, and upon indexing of the dial 76 to dispose the second plane side in position for contact with the grinding wheel 26, the pin 80 will be inserted into the slot 178. In making the second movement of the dial 76 for the grinding of the third arcuate surface, the selector pin 80 will be inserted into the slot 178'. In order to prevent inadvertent insertion of the selector pin 80 into the wrong slot, the pins 96 may be threadedly engaged into the threaded bores 94 to prevent the selector pin 80 from being inserted therein. For example, the pins 96 will be disposed in all of the slots 78 except the slot in which the selector pin 80 is disposed in FIGURE 8 and slots 178 and 178' when triangular-shaped inserts are being ground. As will be evident from FIGURE 3, the illustrated dial 76 has slots in angular relationships so that the dial 76 may be rotated in various angular increments depending upon the number of plane sides about the inserts being ground.

As it will be manifest therefore to those of ordinary skill in the art, the instant invention sets forth a preferred embodiment of a work holder suitable for grinding indexable-throwaway inserts and the various components making up the work holder 10 are merely illustrative such that various other combinations of elements may be utilized and still remain within the scope of the instant invention. For example, the means by which the clamping members 44 and 52 are moved together may take various different forms, the actuating means 54 being merely illustrative. On a larger scale, the entire work holder assembly may be in the form of many various configurations and combinations of elements. It is therefore readily apparent that many configurations of work holders may be designed to perform the invention so long as they are able to perform the novel method of grinding indexable-throwaway inserts of the type having a pair of parallel faces and a plurality of plane sides thereabout extending between the faces with an arcuate surface tangent to and joining the adjacent sides; which method may be accomplished by any such apparatus or by hand by positioning a grinding surface against an insert for grinding a first plane side thereof and thereafter rotating the insert from a first position to a second position about a first axis which is substantially perpendicular to the faces of the insert and displaced from the center axis of the faces so that a first arcuate surface is ground into the insert. Upon rotation of the insert about the first axis a predetermined number of degrees, a second plane side is ground into the insert which is tangent to the first arcuate surface. The insert is then moved out of contact with the grinding surface and rotated about the first axis in the opposite direction back to the initial position whereupon the insert is rotated about the second axis which is in parallel and spaced relationship with the first axis and which second axis passes through the center of the faces so that the second plane side is in the position for minimal contact with the grinding surface. The second plane side, which has been ground into the insert, is then placed into minimal contact with the grinding surface and the insert is once again rotated about the first axis to grind a second arcuate surface tangent to the second plane side and extending to a third plane side which is then ground into the insert. These steps are continued until the entire number of plane sides are ground into the particular insert.

The present invention therefore in its broadest aspects comprehends the grinding of indexable-throwaway inserts by rotating an insert about an axis which is substantially perpendicular to and passes through the center of the faces of the inserts for successfully positioning the sides of the insert for grinding thereof and thereafter intermittently rotating the insert about another axis which is in parallel and spaced relationship with the first-mentioned axis for successively grinding arcuate surfaces which are tangent to and join adjacent sides of the inserts.

The invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A work holder comprising: holding means for rotating a work piece about a first axis and for independently rotating the work piece about a second axis which is in parallel and spaced relationship with said first axis, said holding means including, a cradle adapted to be mounted between first and second mounts for rotation about said first axis, clamping means operatively connected to said cradle for holding a work piece and for selectively rotating the work piece about said second axis relative to said cradle; and adjustment means rotatably interconnecting said cradle and said first and second mounts for selectively changing the distance between said first and second axes.

2. A work holder for use in grinding indexable-throwaway inserts of the type having a pair of parallel faces and a plurality of plane sides thereabout extending between said faces with an arcuate surface tangent to and joining adjacent sides, said work holder comprising: holding means for rotating said inserts about a first axis to grind said arcuate surfaces and for independently rotating said inserts about a second axis which is in parallel and spaced relationship with said first axis to successively position said sides for grinding thereof, said holding means including, a cradle adapted to be mounted between first and second mounts on a grinding machine for rotation about said first axis, clamping means operatively to said cradle for holding said inserts and for selectively rotating said inserts relative to said cradle about said second axis; and adjustment means rotatably interconnecting said cradle and said first and second mounts for selectively changing the distance between said first and second axes to establish the radius of said arcuate surfaces which are tangent to and extend between adjacent sides of said inserts.

3. A work holder for use in grinding indexable-throwaway inserts of the type having a pair of parallel faces and a plurality of plane sides thereabout extending between said faces with an arcuate surface tangent to and joining adjacent sides, said work holder comprising: holding means for rotating said inserts about a first axis to grind said arcuate surfaces and for independently rotating said inserts about a second axis which is in parallel and spaced relationship with said first axis to successively position said sides for grinding thereof, said holding means including, a cradle adapted to be mounted between first and second mounts on a grinding machine for rotation about said first axis, clamping means operatively connected to said cradle for holding said inserts and for selectively rotating said inserts relative to said cradle about said second axis; adjustment means rotatably interconnecting said cradle and said first and second mounts for selectively changing the distance between said first and second axes to establish the radius of said arcuate surfaces which are tangent to and extend between adjacent sides of said inserts; and stop means for limiting the amount of rotation of said cradle in correlation with the number of degrees each of said arcuate surfaces evolves.

4. A work holder for use in grinding indexable-throwaway inserts of the type having a pair of parallel faces and a plurality of plane sides thereabout extending between said faces with an arcuate surface tangent to and joining adjacent sides, said work holder comprising: holding means for rotating said inserts about a first axis to grind said arcuate surfaces and for independently rotating said inserts about a second axis which is in parallel and spaced relationship with said first axis to successively position said sides for grinding thereof, said holding means including, a cradle adapted to be mounted between first and second mounts on a grinding machine for rotation about said first axis, clamping means operatively connected to said cradle for holding said inserts and for selectively rotating said inserts relative to said cradle about said second axis, indexing means for selectively allowing said clamping means to be rotated about said second axis relative to said cradle; and stop means for limiting the amount of rotation of said cradle in correlation with the number of degrees each of said arcuate surfaces evolves.

5. A work holder for use in grinding indexable-throwaway inserts of the type having a pair of parallel faces and a plurality of plane sides thereabout extending between said faces with an arcuate surface tangent to and joining adjacent sides, said work holder comprising: holding means for rotating said inserts about a first axis to grind said arcuate surfaces and for independently rotating said inserts about a second axis which is in parallel and spaced relationship with said first axis to successively position said sides for grinding thereof, said holding means including, a cradle adapted to be mounted between first and second mounts on a grinding machine for rotation about said first axis, clamping means operatively connected to said cradle for holding said inserts and for selectively rotating said inserts relative to said cradle about said second axis, indexing means for selectively allowing said clamping means to be rotated about said second axis relative to said cradle; adjustment means rotatably interconnecting said cradle and said first and second mounts for selectively changing the distance between said first and second axes to establish the radius of said arcuate surfaces which are tangent to and extend between adjacent sides of said inserts; and stop means for limiting the amount of rotation of said cradle in correlation with the number of degrees each of said arcuate surfaces evolves.

6. A work holder comprising: holding means for rotating a work piece about a first axis and for independently rotating the work piece about a second axis which is in parallel and spaced relationship with said first axis, said holding means including, a cradle adapted to be mounted between first and second mounts for rotation about said first axis, clamping means operatively connected to said cradle for holding the work piece and for rotating the work piece relative to said cradle about said second axis, said clamping means including, a first clamping member extending from and disposed in said cradle for rotation about said second axis and a second clamping member coaxial with said first clamping member about said second axis and rotatably and slidably disposed in said cradle with a first end thereof extending toward said first clamping member, indexing means for selectively allowing said clamping members to be rotated about said second axis relative to said cradle; adjustment means rotatably interconnecting said cradle and said first and second mounts for selectively changing the distance between said first and second axes; and stop means for limiting the amount of rotation of said cradle about said first axis.

7. A work holder for use in grinding indexable-throwaway inserts of the type having a pair of parallel faces and a plurality of plane sides thereabout extending between said faces with an arcuate surface tangent to and adjoining adjacent sides, said work holder comprising: holding means for rotating said inserts about a first axis to grind said arcuate surfaces and for independently rotating said inserts about a second axis which is in parallel and spaced relationship with said first axis to successively position said sides for grinding thereof, said holding means including, a cradle adapted to be mounted between first and second mounts on a grinding machine for rotation about said first axis, clamping means operatively connected to said cradle for holding said inserts and for rotating said inserts relative to said cradle about said second axis, said clamping means including, a first clamping member extending from and disposed in said cradle for rotation about said second axis and a second clamping member coaxial with said first clamping member about said second axis and rotatably and slidably disposed in said cradle with a first end thereof extending toward said first clamping member, indexing means for selectively allowing said clamping members to be rotated about said second axis relative to said cradle; adjustment means rotatably interconnecting said cradle and said first and second mounts for selectively changing the distance between said first and second axes to establish the radius of said arcuate surfaces which are tangent to and extend between adjacent sides of said inserts; and stop means for limiting the amount of rotation of said cradle in correlation with the number of degrees each of said arcuate surfaces evolves.

8. A work holder for use in grinding indexable-throwaway inserts of the type having a pair of parallel faces and a plurality of plane sides thereabout extending between said faces with an arcuate surface tangent to and joining adjacent sides, said work holder comprising: holding means for rotating said inserts about a first axis to grind said arcuate surfaces and for independently rotating said inserts about a second axis which is in parallel and spaced relationship with said first axis to successively position said sides for grinding thereof, said holding means including, a cradle adapted to be mounted between first and second mounts on a grinding machine for rotation about said first axis, clamping means operatively connected to said cradle for holding said inserts and for selectively rotating said inserts relative to said cradle about said second axis, said clamping means including, a first clamping member extending from and disposed in said cradle for rotation about said second axis, a second clamping member coaxial with said first clamping member about said second axis and rotatably and slidably disposed in said cradle with a first end thereof extending toward said first clamping member, and actuating means for moving said second clamping member toward said first clamping member and for maintaining said second clamping member a predetermined distance from said first clamping member so that said inserts may be retained between said clamping members, indexing means for selectively allowing said clamping members to be rotated about said second axis relative to said cradle; adjustment means rotatably interconnecting said cradle and said first and second mounts for selectively changing the distance between said first and second axes to establish the radius of said arcuate surfaces which are tangent to and extend between adjacent sides of said inserts; and stop means for limiting the amount of rotation of said cradle in correlation with the number of degrees each of said arcuate surfaces evolves.

9. A work holder for use in grinding indexable-throwaway inserts of the type having a pair of parallel faces and a plurality of plane sides thereabout extending between said faces with an arcuate surface tangent to and joining adjacent sides, said work holder comprising: holding means for rotating said inserts about a first axis to grind said arcuate surfaces and for independently rotating said inserts about a second axis which is in parallel and spaced relationship with said first axis to successively position said sides for grinding thereof, said holding means including, a cradle adapted to be mounted between first and second mounts on a grinding machine for rotation about said first axis, clamping means operatively connected to said cradle for holding said inserts and for selectively rotating said inserts relative to said cradle about said second axis, said clamping means including, a first clamping member extending from and disposed in said cradle for rotation about said second axis, a second clamping member coaxial with said first clamping member about said second axis and rotatably and slidably disposed in said cradle with a first end thereof extending toward said first clamping member, and actuating means for moving said second clamping member toward said first clamping member and for maintaining said second clamping member a predetermined distance from said first clamping member so that said inserts may be retained between said clamping members, indexing means for selectively allowing said clamping members to be rotated about said second axis relative to said cradle, said indexing means including, a dial extending radially about said second clamping member with a plurality or radial slots disposed circumferentially thereabout in predetermined angular relationships, a selector pin slidably disposed in said cradle for insertion into selective ones of said slots to prevent rotation of said dial relative to said cradle, and a spring coacting with said cradle and said selector pin for biasing said selector pin into any selected one of said slots; adjustment means rotatably interconnecting said cradle and said first and second mounts for selectively changing the distance between said first and second axes to establish the radius of said arcuate surfaces which are tangent to and extend between adjacent sides of said inserts; and stop means for limiting the amount of rotation of said cradle in correlation with the number of degrees each of said arcuate surfaces evolves.

10. A work holder for use in grinding indexable-throwaway inserts of the type having a pair of parallel faces and a plurality of plane sides thereabout extending between said faces with an arcuate surface tangent to and joining adjacent sides, said work holder comprising: holding means for rotating said inserts about a first axis to grind said arcuate surfaces and for independently rotating said inserts about a second axis which is in parallel and spaced relationship with said first axis to successively position said sides for grinding thereof, said holding means including, a cradle adapted to be mounted between first and second mounts on a grinding machine for rotation about said first axis, and clamping means operatively connected to said cradle for holding said inserts and for selectively rotating said inserts relative to said cradle about said second axis; adjustment means for selectively changing the distance between said first and second axes to establish the radius of said arcuate surfaces which are tangent to and extend between adjacent sides of said inserts, said adjustment means including, a first support pin having a cone-shaped end and extending from said first mount, a second support pin having a cone-shaped end and extending from said second mount, said first and second support pins being coaxial about said first axis, said cradle having a first dovetail slot in the first end thereof and a second dovetail slot in the second end thereof, a first block having a trapezoidal cross section disposed in said first dovetail slot, first retaining means for selectively preventing relative movement between said first block and said cradle, said first block having a cone-shaped recess for receiving said cone-shaped end of said first support pin, a second block having a trapezoidal cross section disposed in said second dovetail slot, second retaining means for selectively preventing relative movement between said second block and said cradle, and said second block having a cone-shaped recess therein for receiving said cone-shaped end of said second support pin; and stop means for limiting the amount of rotation of said cradle in correlation with the number of degrees each of said arcuate surfaces evolves and including, a stop plate removably mounted on said first mount, first and second stop pins extending from said stop plate toward said first end of said cradle, and a third stop pin extending from said first block toward said first mount for engaging said first and second stop pins respectively to define a predetermined arc of rotary movement of said cradle about said first axis.

11. A work holder for use in grinding indexable-throwaway inserts of the type having a pair of parallel faces and a plurality of plane sides thereabout extending between said faces with an arcuate surface tangent to and joining adjacent sides, said work holder comprising: holding means for rotating said inserts about a first axis to grind said arcuate surfaces and for independently rotating said inserts about a second axis which is in parallel and spaced relationship with said first axis to successively position said sides for grinding thereof, said holding means including, a cradle adapted to be mounted between first and second mounts on a grinding machine for rotation about said first axis, clamping means operatively connected to said cradle for holding said inserts and for rotating said inserts relative to said cradle about said second axis, and indexing means for selectively allowing said clamping means to be rotated about said second axis relative to said cradle; adjustment means for selectively changing the distance between said first and second axes to establish the radius of said arcuate surfaces which are tangent to and extend between adjacent sides of said inserts, said adjustment means including, a first support pin having a cone-shaped end and extending from said first mount, a second support pin having a cone-shaped end and extending from said second mount, said first and second support pins being coaxial about said first axis, said cradle having a first dovetail slot in the first end thereof and a second dovetail slot in the second end thereof, a first block having a trapezoidal cross section disposed in said first dovetail slot, first retaining means for selectively preventing relative movement between said first block and said cradle, said first block having a cone-shaped recess for receiving said cone-shaped end of said first support pin, a second block having a trapezoidal cross section disposed in said second dovetail slot, second retaining means for selectively preventing relative movement between said second block and said cradle, and said second block having a cone-shaped recess therein for receiving said cone-shaped end of said second support pin; and stop means for limiting the amount of rotation of said cradle in correlation with the number of degrees each of said arcuate surfaces evolves and including, a stop plate removably mounted on said first mount, first and second stop pins extending from said stop plate toward said first end of said cradle, and a third stop pin extending from said first block toward said first mount for engaging said first and second stop pins respectively to define a predetermined arc of rotary movement of said cradle about said first axis.

12. A work holder for use in grinding indexable-throwaway inserts of the type having a pair of parallel faces and a plurality of plane sides thereabout extending between said faces with an arcuate surface tangent to and joining adjacent sides, said work holder comprising: holding means for rotating said inserts about a first axis to grind said arcuate surfaces and for independently rotating said inserts about a second axis which is in parallel and spaced relationship with said first axis to successively position said sides for grinding thereof, said holding means including, a cradle adapted to be mounted between first and second mounts on a grinding machine for rotation about said first axis, clamping means operatively connected to said cradle for holding said inserts and for rotating said inserts relative to said cradle about said second axis, and indexing means for selectively allowing said clamping means to be rotated about said second axis relative to said cradle, said indexing means including, a dial extending radially about said clamping means with a plurality of radial slots disposed circumferentially thereabout in predetermined angular relationships, a selector pin slidably disposed in said cradle for insertion into selective ones of said slots to prevent rotation of said dial relative to said cradle, and a spring coacting with said cradle and said selector pin for biasing said selector pin into any selected one of said slots; adjustment means for selectively changing the distance between said first and second axes to establish the radius of said arcuate surfaces which are tangent to and extend between adjacent sides of said inserts, said adjustment means including, a first support pin having a cone-shaped end and extending from said first mount, a second support pin having a cone-shaped end and extending from said second mount, said first and second support pins being coaxial about said first axis, said cradle having a first dovetail slot in the first end thereof and a second dovetail slot in the second end thereof, a first block having a trapezoidal cross section disposed in said first dovetail slot, first retaining means for selectively preventing relative movement between said first block and said cradle, said first block having a cone-shaped recess for receiving said cone-shaped end of said first support pin, a second block having a trapezoidal cross section disposed in said second dovetail slot, second retaining means for selectively preventing relative movement between said second block and said cradle, and said second block having a cone-shaped recess therein for receiving said cone-shaped end of said second support pin; and stop means for limiting the amount of rotation of said cradle in correlation with the number of degrees each of said arcuate surfaces evolves and including, a stop plate removably mounted on said first mount, first and second stop pins extending from said stop plate toward said first end of said cradle, and a third stop pin extending from said first block toward said first mount for engaging said first and second stop pins respectively to define a predetermined arc of rotary movement of said cradle about said first axis.

13. A work holder for use in grinding indexable-throw-away inserts of the type having a pair of parallel faces and a plurality of plane sides thereabout extending between said faces with an arcuate surface tangent to and joining adjacent sides, said work holder comprising: holding means for rotating said inserts about a first axis to grind said arcuate surfaces and for independently rotating said inserts about a second axis which is in parallel and spaced relationship with said first axis to successively position said sides for grinding thereof, said holding means including, a cradle adapted to be mounted between first and second mounts on a grinding machine for rotation about said first axis, clamping means operatively connected to said cradle for holding said inserts and for selectively rotating said inserts relative to said cradle about said second axis, said clamping means including, a first clamping member extending from and disposed in said cradle for rotation about said second axis, a second clamping member coaxial with said first clamping member about said second axis and rotatably and slidably disposed in said cradle with a first end thereof extending toward said first clamping member, and actuating means for moving said second clamping member toward said first clamping member and for maintaining said second clamping member a predetermined distance from said first clamping member so that said inserts may be retained between said clamping members, indexing means for selectively allowing said clamping members to be rotated about said second axis relative to said cradle; adjustment means for selectively changing the distance between said first and second axes to establish the radius of said arcuate surfaces which are tangent to and extend between adjacent sides of said inserts, said adjustment means including, a first support pin having a cone-shaped end and extending from said first mount, a second support pin having a cone-shaped end and extending from said second mount, said first and second support pins being coaxial about said first axis, said cradle having a first dovetail slot in the first end thereof and a second dovetail slot in the second end thereof, a first block having a trapezoidal cross section disposed in said first dovetail slot, first retaining means for selectively preventing relative movement between said first block and said cradle, said first block having a cone-shaped recess for receiving said cone-shaped end of said first support pin, a second block having a trapezoidal cross section disposed in said second dovetail slot, second retaining means for selectively preventing relative movement between said second block and said cradle, and said second block having a cone-shaped recess therein for receiving said cone-shaped end of said second support pin; and stop means for limiting the amount of rotation of said cradle in correlation with the number of degrees each of said arcuate surfaces evolves and including, a stop plate removably mounted on said first mount, first and second stop pins extending from said stop plate toward said first end of said cradle, and a third stop pin extending from said first block toward said first mount for engaging said first and second stop pins respectively to define a predetermined arc of rotary movement of said cradle about said first axis.

14. A work holder for use in grinding indexable-throw-away inserts of the type having a pair of parallel faces and a plurality of plane sides thereabout extending between said faces with an arcuate surface tangent to and joining adjacent sides, said work holder comprising: holding means for rotating said inserts about a first axis to grind said arcuate surfaces and for independently rotating said inserts about a second axis which is in parallel and spaced relationship with said first axis to successively position said sides for grinding thereof, said holding means including, a cradle adapted to be mounted between first and second mounts on a grinding machine for rotation about said first axis, clamping means operatively connected to said cradle for holding said inserts and for selectively rotating said inserts relative to said cradle about said second axis, said clamping means including, a first clamping member extending from and disposed in said cradle for rotation about said second axis, a second clamping member coaxial with said first clamping member about said second axis and rotatably and slidably disposed in said cradle with a first end thereof extending toward said first clamping member, and actuating means for moving said second clamping member toward said first clamping member and for maintaining said second clamping member a predetermined distance from said first clamping member so that said inserts may be retained between said clamping members, indexing means for selectively allowing said clamping members to be rotated about said second axis relative to said cradle, said indexing means including, a dial extending radially about said second clamping member with a plurality of radial slots disposed circumferentially thereabout in predetermined angular relationships, a selector pin slidably disposed in said cradle for insertion into selective ones of said slots to prevent rotation of said dial relative to said cradle, and a spring coacting with said cradle and said selector pin for biasing said selector pin into any selected one of said slots; adjustment means rotatably interconnecting said cradle and said first and second mounts for selectively changing the distance between said first and second axes to establish the radius of said arcuate surfaces which are tangent to and extend between adjacent sides of said inserts; and stop means for limiting the amount of rotation of said cradle in correlation with the number of degrees each of said arcuate surfaces evolves and includes, a stop plate removably mounted on said first mount, first and second stop pins extending from said stop plate toward said cradle, and a third stop pin extending from said cradle toward said first mount for engaging said first and second stop pins respectively to define a predetermined arc of rotary movement of said cradle about said first axis.

15. A work holder for use in grinding indexable-throw-away inserts of the type having a pair of parallel faces and a plurality of plane sides thereabout extending between said faces with an arcuate surface tangent to and joining adjacent sides, said work holder comprising: holding means for rotating said inserts about a first axis to grind said arcuate surfaces and for independently rotating said inserts about a second axis which is in parallel and spaced relationship with said first axis to successively position said sides for grinding thereof, said holding means including, a cradle adapted to be mounted between first and second mounts on a grinding machine for rotation about said first axis, clamping means operatively connected to said cradle for holding said inserts and for selectively rotating said inserts relative to said cradle about said second axis, said clamping means including, a first clamping member extending from and disposed in said cradle for rotation about said second axis, a second clamping member coaxial with said first clamping member about said second axis and rotatably and slidably disposed in said cradle with a first end thereof extending toward said first clamping member, and actuating means for moving said second clamping member toward said first clamping member and for maintaining said second clamping member a predetermined distance from said first clamping member so that said inserts may be retained between said clamping members, indexing means for selectively allowing said clamping members to be rotated about said second axis relative to said cradle, said indexing means including, a dial extending radially about said second clamping member with a plurality of radial slots disposed circumferentially thereabout in predetermined angular relationships, a selector pin slidably disposed in said cradle for insertion into selective ones of said slots to prevent rotation of said dial relative to said cradle, and a spring coacting with said cradle and said selector pin for biasing said selector pin into any selected one of said slots; adjustment means for selectively changing the distance between said first and second axes to establish the radius of said arcuate surfaces which are tangent to and extend between adjacent sides of said inserts, said adjustment means including a first support pin having a cone-shaped end and extending from said first mount, a second support pin having a cone-shaped end and extending from said second mount, said first and second support pins being coaxial about said first axis, said cradle having a first dovetail slot in the first end thereof and a second dovetail slot in the second end thereof, a first block having a trapezoidal cross section disposed in said first dovetail slot, first retaining means for selectively preventing relative movement between said first block and said cradle, said first block having a cone-shaped recess for receiving said cone-shaped end of said first support pin, a second block having a trapezoidal cross section disposed in said second dovetail slot, second retaining means for selectively preventing relative movement between said second block and said cradle, and said second block having a cone-shaped recess therein for receiving said cone-shaped end of said second support pin; and stop means for limiting the amount of rotation of said cradle in correlation with the number of degrees each of said arcuate surfaces evolves.

16. A work holder comprising: holding means for rotating a work piece about a first axis and for independently rotating the work piece about a second axis which is in parallel and spaced relationship with said first axis, said holding means including, a cradle adapted to be mounted between first and second mounts for rotation about said first axis, clamping means operatively connected to said cradle for holding the work piece and for selectively rotating the work piece relative to said cradle about said second axis, said clamping means including, a first clamping member extending from and disposed in said cradle for rotation about said second axis, a second clamping member coaxial with said first clamping member about said second axis and rotatably and slidably disposed in said cradle with a first end thereof extending toward said first clamping member, and actuating means for moving said second clamping member toward said first clamping member and for maintaining said second clamping member a predetermined distance from said first clamping member so that the work piece may be retained between said clamping members, indexing means for selectively allowing said clamping members to be rotated about said second axis relative to said cradle, said indexing means including, a dial extending radially about said second clamping member with a plurality of radial slots disposed circumferentially thereabout in predetermined angular relationships, a selector pin slidably disposed in said cradle for insertion into selective ones of said slots to prevent rotation of said dial relative to said cradle, and a spring coacting with said cradle and said selector pin for biasing said selector pin into any selected one of said slots; adjustment means for selectively changing the distance between said first and second axes, said adjustment means including, a first support pin having a cone-shaped end and extending from said first mount, a second support pin having a cone-shaped end and extending from said second mount, said first and second support pins being coaxial about said first axis, said cradle having a first dovetail slot in the first end thereof and a second dovetail slot in the second end thereof, a first block having a trapezoidal cross section disposed in said first dovetail slot, first retaining means for selectively preventing relative movement between said first block and said cradle, said first block having a cone-shaped recess for receiving said cone-shaped end of said first support pin, a second block having a trapezoidal cross section disposed in said second dovetail slot, second retaining means for selectively preventing relative movement between said second block and said cradle, and said second block having a cone-shaped recess therein for receiving said cone-shaped end of said second support pin; and stop means for limiting the amount of rotation of said cradle about said first axis and including, a stop plate removably mounted on said first mount, first and second stop pins extending from said stop plate toward said first end of said cradle, and a third stop pin extending from said first block toward said first mount for engaging said first and second pins respectively to define a predetermined arc of rotary movement of said cradle about said first axis.

17. A work holder for use in grinding indexable-throwaway inserts of the type having a pair of parallel faces and a plurality of plane sides thereabout extending between said faces with an arcuate surface tangent to and joining adjacent sides, said work holder comprising: holding means for rotating said inserts about a first axis to grind said arcuate surfaces and for independently rotating said inserts about a second axis which is in parallel and spaced relationship with said first axis to successively position said sides for grinding thereof, said holding means including, a cradle adapted to be mounted between first and second mounts on a grinding machine rotation about said first axis, clamping means operatively connected to said cradle for holding said inserts and for selectively rotatting said inserts relative to said cradle about said axis, said clamping means including, a first clamping member extending from and disposed in said cradle for rotation about said second axis, a second clamping member coaxial with said first clamping member about said second axis and rotatably and slidably disposed in said cradle with a first end thereof extending toward said first clamping member, and actuating means for moving said second clamping member toward said first clamping member and for maintaining said second clamping member a predetermined distance from said first clamping member so that said inserts may be retained between said clamping members, indexing means for selectively allowing said clamping members to be rotated about said second axis relative to said cradle, said indexing means including a dial extending radially about said second clamping member with a plurality of radial slots disposed circumferentialy thereabout in predetermined angular relationships, a selector pin slidably disposed in said cradle for insertion into selective ones of said slots to prevent rotation of said dial relative to said cradle, and a spring coacting with said cradle and said selector pin for biasing said selector pin into any selected one of said slots; adjustment means for selectively changing the distance between said first and second axes to establish the radius of said arcuate surfaces which are tangent to and extend between adjacent sides of said inserts, said adjustment means including, a first support pin having a cone-shaped end and extending from said first mount, a second support pin having a cone-shaped end and extending from said second mount, said first and second support pins being coaxial about said first axis, said cradle having a first dovetail slot in the first end thereof and a second dovetail slot in the second end thereof, a first block having a trapezoidal cross section disposed in said first dovetail slot, first retaining means for selectively preventing relative movement between said first block and said cradle, said first block having a cone-shaped recess for receiving said cone-shaped end of said first support pin, a second block having a trapezoidal cross section disposed in said second dovetail slot, second retaining means for selectively preventing relative movement between said second block and said cradle, and said second block having a cone-shaped recess therein for receiving said cone-shaped end of said second support pin; and stop means for limiting the amount of rotation of said cradle in correlation with the number of degrees each of said arcuate surfaces evolves and including, a stop plate removably mounted on said first mount, first and second stop pins extending from said stop plate toward said first end of said cradle, and a third stop pin extending from said first block toward said first mount for engaging said first and second stop pins respectively to define a predetermined arc of rotary movement of said cradle about said first axis.

18. A work holder for use in grinding indexable-throwaway inserts of the type having a pair of parallel faces and a plurality of plane sides thereabout extending between said faces with an arcuate surface tangent to and joining adjacent sides, said work holder comprising: holding means for rotating said inserts about a first axis to grind said arcuate surfaces and for independently rotating said inserts about a second axis which is in parallel and spaced relationship with said first axis to successively position said sides for grinding thereof, said holding means including, a cradle adapted to be mounted between first and second mounts on a grinding machine for rotation about said first axis, clamping means operatively connected to said cradle for holding said inserts and for selectively rotating said inserts relative to said cradle about said second axis, said clamping means including, a first clamping member extending from and disposed in said cradle for rotation about said second axis, a second clamping member coaxial about said second axis with said first clamping member and rotatably and slidably disposed in said cradle with a first end thereof extending toward said first clamping member, and actuating means for moving said second clamping member toward said first clamping member and for maintaining said second clamping member a predetermined distance from said first clamping member so that said inserts may be retained between said clamping members, indexing means for selectively allowing said clamping members to be rotated about said second axis relative to said cradle, said indexing means including, a dial extending radially about said second clamping member with a plurality of radial slots disposed circumferentially thereabout in predetermined angular relationships, a selector pin slidably disposed in said cradle for insertion into selective ones of said slots to prevent rotation of said dial relative to said cradle, and a spring coacting with said cradle and said selector pin for biasing said selector pin into any selected one of said slots; adjustment means for selectively changing the distance between said first and second axes to establish the radius of said arcuate surfaces which are tangent to and extend between adjacent sides of said inserts, said adjustment means including, a first support pin having a cone-shaped end and extending from said first mount, a second support pin having a cone-shaped end and extending from said second mount, said first and second support pins being coaxial about said first axis, said cradle having a first dovetail slot in the first end thereof and a second dovetail slot in the second end thereof, a first block having dovetail slot in the second end thereof, a first block dovetail slot, first retaining means for selectively preventing relative movement between said first block and said cradle and including, a first spacer plate disposed in said first dovetail slot with said first block, a first set screw threadedly disposed in said cradle for engaging said first spacer plate, said first block having a cone-shaped recess for receiving said cone-shaped end of said first support pin, a second block having a trapezoidal cross section disposed in said second dovetail slot, second retaining means for selectively preventing relative movement between said second block and said cradle and including, a second spacer plate disposed in said second dovetail slot with said second block, a second set screw threadedly disposed in said cradle for engaging said second spacer plate, and said second block having a cone-shaped recess therein for receiving said cone-shaped end of said second support pin; and stop means for limiting the amount of rotation of said cradle in correlation with the number of degrees each of said arcuate surfaces evolves and including, a stop plate removably mounted on said first mount, first and second stop pins extending from said stop plate toward said first end of said cradle, and a third stop pin extending from said first block toward said first mount for engaging said first and second stop pins respectively to define a predetermined arc of rotary movement of said cradle about said first axis.

19. A work holder for use in grinding indexble-throw- and a plurality of plane sdes thereabout extending be- and a plurality of plane sides therealong extending between said faces with an arcuate surface tangent to and joining adjacent sides, said work holder comprising: holding means for rotating said inserts about a first axis to grind said arcuate surfaces and for independently rotating said inserts about a second axis which is in parallel and spaced relationship with said first axis to successively position said sides for grinding thereof, said holding means including, a cradle adapted to be mounted between first and second mounts on a grinding machine for rotation about said first axis, clamping means operatively connected to said cradle for holding said inserts and for selectively rotating said inserts relative to said cradle about said second axis, said clamping means including, a first clamping member extending from and disposed in said cradle for rotation about said second axis, a second clamping member coaxial with said first clamping member about said second axis and rotatably and slidably disposed in said cradle with a first end thereof extending toward said first clamping member, and actuating means for moving said second clamping member toward said first clamping member and for maintaining said second clamping member a predetermined distance from said first clamping member so that said inserts may be retained between said clamping members, said actuating means including a ball disposed in said cradle in abutting relationship with the second end of said second clamping member, a plunger disposed for movement in said cradle and in abutting relationship with said ball, and positioning means disposed on said cradle for moving said plunger and for locking said plunger in a predetermined position to maintain said inserts between said clamping members, indexing means for selectively allowing said clamping members to be rotated about said second axis relative to said cradle, said indexing mens including, a dial extending radially about said second clamping member with a plurality of radial slots disposed circumferentially thereabout in predetermined angular relationships, a selector pin slidably disposed in said cradle for insertion into selective ones of said slots to prevent rotation of said dial relative to said cradle, a spring coacting with said cradle and said selector pin for bising said selector pin into any selected one of said slots, and said dial having a threaded bore at the radially inward extremity of each of said slots so that a threaded pin may be inserted in certain ones of said slots to prevent said selector pin from being inserted into said certain ones of said slots; adjustment means for selectively changing the distance between said first and second axes to establish the radius of said arcuate surfaces which are tangent to and extend between adjacent sides of said inserts, said adjustment means including, a first support pin having a cone-shaped end and extending from said first mount, a second support pin having a cone-shaped end and extending from said second mount, said first and second support pins being coaxial about said first axis, said cradle having a first dovetail slot in the first end thereof and a second dovetail slot in the second end thereof, a first block having a trapezoidal cross section disposed in said first dovetail slot, first retaining means for selectively preventing relative movement between said first block and said cradle and including, a first spacer plate disposed in said first dovetail slot with said first block, a first set screw threadedly disposed in said cradle for engaging said first spacer plate, said first block having a cone-shaped recess for receiving said cone-shaped end of said first support pin, a second block having a trapezoidal cross section disposed in said second dovetail slot, second retaining means for selectively preventing relative movement between said second block and said cradle and including, a second spacer plate disposed in said second dovetail slot with said second block, a second set screw threadedly disposed in said cradle for engaging said second spacer plate, and said second block having a cone-shaped recess therein for receiving said cone-shaped end of said second support pin; and stop means for limiting the amount of rotation of said cradle in correlation with the number of degrees each of said arcuate surfaces evolves and including, a stop plate removably mounted on said first mount, first and second stop pins extending from said stop plate toward said first end of said cradle, and a third stop pin extending from said first block toward said first mount for engaging said first and second stop pins respectively to define a predetermined arc of rotary movement of said cradle about said first axis.

20. A method for grinding indexable-throwaway inserts of the type having a pair of parallel faces and a plurality of plane sides thereabout extending between said faces with an arcuate surface tangent to and joining adjacent sides, said member comprising the steps of; positioning a grinding surface against said insert for grinding a first side thereof, rotating said insert from a first position to a second position about a first axis which is substantially perpendicular to the faces of said insert and displaced from the center of said faces for grinding a first arcuate surface tangent to said first side, grinding a second side which is tangent to said first arcuate surface, positioning said grinding surface out of contact with said insert, rotating said insert about said first axis from said second position back to said first position, rotating said insert about a second axis which is in parallel and spaced relationship with said first axis and which second axis passes through the center of said faces to place said second side in position for contacting said grinding surface, positioning said second side in minimal contact with said grinding surface, rotating said insert about said first axis for grinding a second arcuate surface tangent to said second side, and grinding a third side which is tangent to said second arcuate surface.

21. A method for grinding indexable-throwaway inserts of the type having a pair of parallel faces and a plurality of plane sides thereabout extending between said faces with an arcuate surface tangent to and joining adjacent sides, said method comprising the steps of; rotating an insert to a predetermined position about a first axis which is substantially perpendicular to and passing through the center of said faces, positioning a grinding surface against said insert for grinding a first side thereof, rotating said insert from a first position to a second position about a second axis which is in parallel and spaced relationship to said first axis for grinding a first arcuate surface tangent to said first side, grinding a second side which is tangent to said first arcuate surface, positioning said grinding surface out of contact with said insert, rotating said insert about said second axis from said second position back to said first position, rotating said insert about said first axis to place said second side in position for contacting said grinding surface, positioning said second side in contact with said grinding surface, rotating said insert about said second axis for grinding a second arcuate surface tangent to said second side, grinding a third side which is tangent to said second arcuate surface, repeating said steps until the total number of sides on said insert have been ground, and adjusting the distance between said first and second axes to adjust the radius of said arcuate surfaces for various inserts.

22. A work holder for use in grinding indexable throwaway inserts of the type having a pair of parallel faces and a plurality of plane sides thereabout extending between said faces with an arcuate surface joining adjacent sides, said work holder comprising; a cradle adapted to be mounted on a grinding machine for rotation about a first axis, clamping means operatively connected to said cradle for holding said inserts in a predetermined position relative to a second axis which is in parallel and spaced relation to said first axis, and adjustment means operatively interconnecting said cradle and said machine for selectively changing the distance between said first and second axes.

23. A work holder for use in grinding indexable throwaway inserts of the type having a pair of parallel faces and a plurality of plane sides thereabout and extending between said faces, said work holder comprising: a cradle having coaxial first and second ends disposed on a first axis and adapted to be mounted between first and second coaxial mounts on a grinding machine for rotation about said first axis, said cradle having a portion defining a recess which extends thereinto from said first axis, and clamping means connected to said cradle and disposed in said recess for clamping said inserts along a second axis which is in parallel and spaced relationship to said first axis and which second axis passes through the faces of said inserts when held by said clamping means whereby said cradle may be rotated about said first axis for grinding successive sides of said inserts.

24. A work holder as set forth in claim 23 wherein said clamping means includes a first clamping member connected to said cradle in said recess and a second clamping member connected to said cradle in said recess, said clamping members being coaxial relative to said second axis and providing opposing plane end surfaces for clamping faces of said inserts for holding inserts therebetween, one of said clamping members being movable along said second axis for clamping coaction with the other clamping member.

25. A work holder for use in grinding indexable-throwaway inserts of the type having a pair of parallel faces and a plurality of plane sides thereabout extending between said faces with an arcuate surface joining adjacent sides, said work holder comprising: holding means for rotating said inserts about a first axis and for independently rotating said inserts about a second axis which is in parallel and spaced relationship with said first axis, said holding means including, a cradle having coaxial first and second ends disposed on said first axis and adapted to be mounted between first and second coaxial mounts on a grinding machine for rotation about said first axis to successively grind said sides and said arcuate surfaces, said cradle having a portion defining a recess which extends thereinto from said first axis, and clamping means operatively connected to said cradle in said recess between said first and second ends thereof to clamp said inserts and for rotating said inserts relative to said cradle about said second axis.

26. A work holder as set forth in claim 25 wherein said clamping means includes a first clamping member disposed in said recess for rotation about said second axis and a second clamping member disposed in said recess for rotation about said second axis, said clamping members having plane end surfaces extending transversely to said second axis for clamping engagement with said faces of said inserts, said second clamping member being slidable in said cradle along said second axis for clamping said inserts between said end surfaces of said clamping members.

27. A work holder as set forth in claim 26 including adjustment means for selectively changing the distance between said first and second axes, stop means for limiting the amount of rotation of said cradle, and indexing means for controlling rotation of said clamping members about said second axis.

28. A work holder as set forth in claim 26 including adjustment means for selectively moving said axes together and apart along a straight line path.

29. In combination: a grinding machine having a grinding wheel with a radial planar grinding surface and a pair of spaced mounts disposed on a first axis which is parallel to said grinding surface; a work holder supported between said mounts for grinding indexable-throwaway inserts of the type having a pair of parallel faces and a plurality of plane sides thereabout extending between said faces, said work holder comprising holding means clamping said inserts on a second axis which passes through the faces thereof and is in spaced and parallel relationship to said first axis for rotating said inserts to successively grind said sides of said inserts, said first axis being closer to said grinding surface than said second axis.

30. A method for grinding indexable-throwaway inserts of the type having a pair of parallel faces and a plurality of plane sides thereabout and extending between said faces with an arcuate surface joining adjacent sides, said method comprising the steps of: positioning a grinding surface against said insert for grinding a first side thereof while said insert is in a first position on a first axis which passes through said faces thereof, rotating said insert from said first position to a second position about a second axis which is parallel to and spaced from said first axis and passes through said faces for grinding a first arcuate surface and a second side, positioning said grinding surface out of contact with said insert, repositioning said insert and positioning said grinding surface into minimal contact with one of said first and second sides which have been ground, rotating said insert about said second axis for grinding a second arcuate surface and a third side.

References Cited
UNITED STATES PATENTS

| | | | |
|---|---|---|---|
| 1,363,194 | 12/1920 | Koning | 51—124 X |
| 2,283,289 | 5/1942 | Roesch | 51—124 |
| 2,351,246 | 6/1944 | Walling | 51—216 |
| 2,771,723 | 11/1956 | Burleson | 51—234 X |
| 2,871,627 | 2/1959 | Bringelson | 51—124 X |

HAROLD D. WHITEHEAD, *Primary Examiner.*

U.S. Cl. X.R.

51—237, 234, 281

UNITED STATES PATENT OFFICE
CERTIFICATE OF CORRECTION

Patent No. 3,434,245     Dated March 25, 1968

Inventor(s) Robert J. Stuart

It is certified that error appears in the above-identified patent and that said Letters Patent are hereby corrected as shown below:

Column 4, line 11 "deltaied" should be --detailed--. Column 10, line 33 after "operatively" insert --connected--. Column 16, line 50 "includes" should be --including--. Column 18, line 38 after "machine" insert --for--. Column 19, line 68 after "having" delete "dovetail slot in the second end thereof, a first block" and insert --a trapezoidal cross section disposed in said first--. Column 20, line 21 "indexble" should be --indexable--; column 20, after line 21 insert the following as the next line --away inserts of the type having a pair of parallel faces--; column 20, line 22, "sdes" should be --sides--; column 20, delete line 23 entirely; column 20, line 57 "mens" should be --means--; column 20, line 64 "bising" should be --biasing--. Column 21, line 37 "member" should be --method--.

SIGNED AND
SEALED
MAR 3 1 1970

(SEAL)
Attest:

Edward M. Fletcher, Jr.
Attesting Officer

WILLIAM E. SCHUYLER, JR.
Commissioner of Patents